United States Patent Office 3,526,482
Patented Sept. 1, 1970

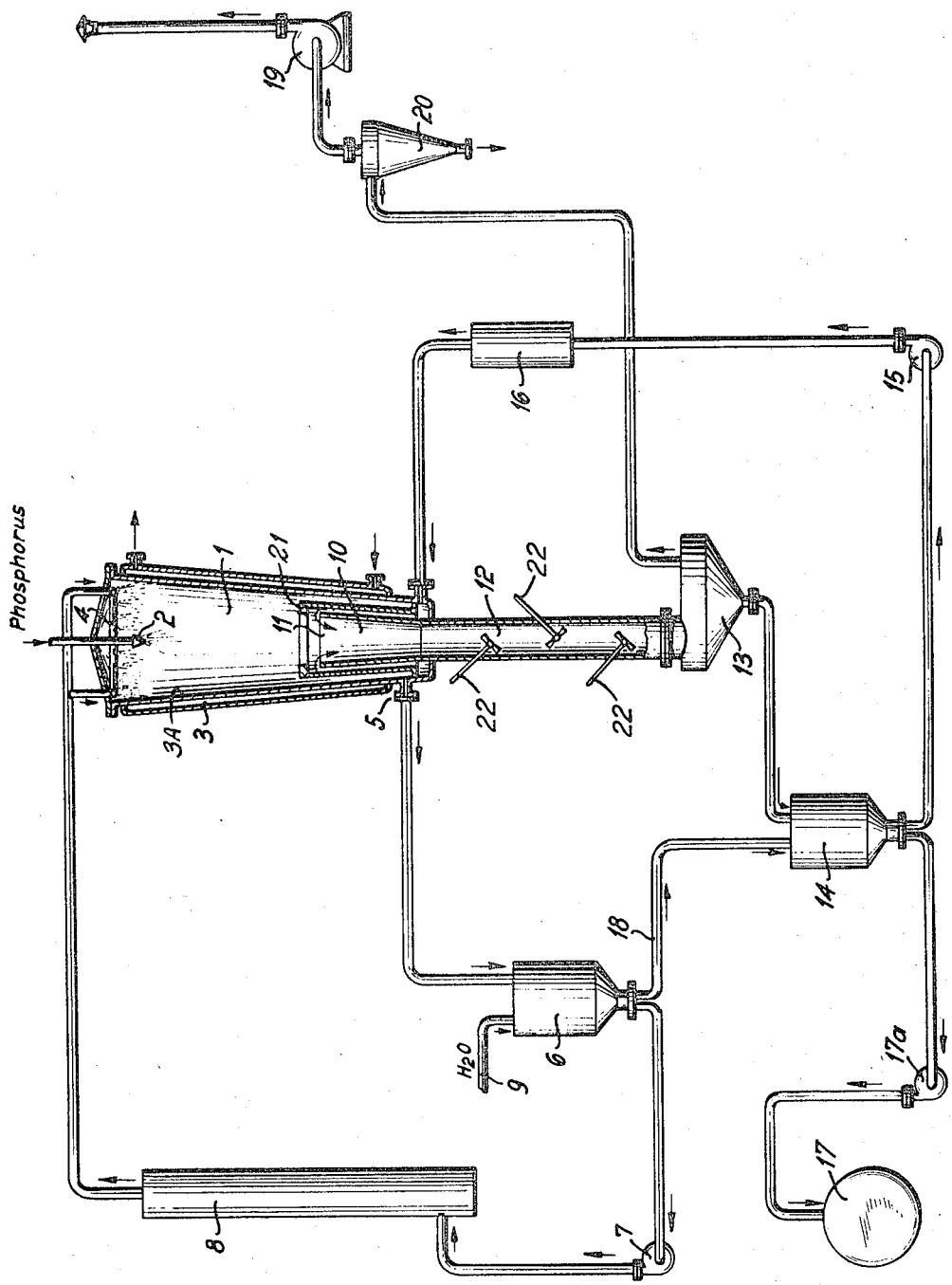

3,526,482
APPARATUS FOR PRODUCING POLYPHOSPHORIC ACID
Klaus Beltz, Knapsack, near Cologne, Joseph Cremer, Hermulheim, near Cologne, Günther Müller-Schiedmayer, Knapsack, near Cologne, and Friedrich Thomas, Hermulheim, near Cologne, Germany, assignors to Knapsack-Griesheim Aktiengesellschaft, Knapsack, near Cologne, Germany, a corporation of Germany
Original application July 25, 1962, Ser. No. 212,773, now Patent No. 3,387,929, dated June 11, 1968. Divided and this application Feb. 19, 1968, Ser. No. 719,285
Claims priority, application Germany, Aug. 5, 1961, K 44,440
Int. Cl. C01b *25/20;* B01j *1/22*
U.S. Cl. 23—283                                5 Claims

ABSTRACT OF THE DISCLOSURE

An apparatus for producing polyphosphoric acid whereby combustion and a coolant spray for substantial removal of heat of combustion of phosphorus are positioned at the upper end of a generally cone-shaped reactor and an absorption column with separately circulated absorbent is attached at the lower end of the reactor and positioned to be internally concentric therewith.

---

By polyphosphoric acid, there are understood phosphoric acids having an $H_3PO_4$ content of more than 100% $H_3PO_4$ (72.5% $P_2O_5$) which are produced by adjusting the corresponding ratio between the phosphorus pentoxide and water in suitable manner. In the system $P_2O_5$–$H_2O$, two regions free of crystallization exist above 72.5% $P_2O_5$, namely, between 76.0 and 77.5% $P_2O_5$ (105% and 107% $H_3PO_4$) and above 81.0% $P_2O_5$ (112% $H_3PO_4$). In order to obtain liquid polyphosphoric acids which are stable against subcooling, the phosphorus pentoxide content is limited to these ranges. The intermediate range of polyphosphoric acids crystallizes upon cooling. The $P_2O_5$ content of the polyphosphoric acids can reach metaphosphoric acid with 89% $P_2O_5$ and even be higher than this.

Methods are already known for producing polyphosphoric acids having phosphorus pentoxide contents of up to 87% $P_2O_5$ by burning white phosphorus with air or oxygen-containing gases, and absorbing the phosphorus pentoxide from the combustion gases in phosphoric acid which cover the wall of the combustion chamber, and at the same time take up the heat of combustion of the phosphorus.

The present application is a divisional application of application Ser. No. 212,773, filed July 25, 1962, now issued as U.S. Pat. 3,387,929, and relates to a device for producing polyphosphoric acid as a mixture of condensed phosphoric acids which are present as pyro-, tripoly-, tetrapoly-, and higher phosphoric acids, by burning phosphorus and absorbing the phosphorus pentoxide from the combustion gases in phosphoric acids.

Furthermore, it has already been attempted to remove by evaporation of water a large part of the heat which is produced in phosphorus combustion processes for the recovery of phosphoric acid. For this purpose, either large amounts of water are sprayed into the hot combustion gases, or the hot gases are introduced into large volumes of water or dilute acid. By this process, only phosphoric acids of low concentration, i.e., of about 85% to 95% $H_3PO_4$ can be obtained.

Due to the large amounts of water which are necessary in order to cool the combustion gases to the acid temperature, it is impossible to produce polyphosphoric acids of a concentration of 105% $H_3PO_4$ to 116% $H_3PO_4$ and higher. An evaporation of water from the polyphosphoric acids of a concentration of more than 105% $H_3PO_4$ takes place only in a temperature range above 300° C., the temperature increasing with an increase in the $P_2O_5$ concentration, such increase being at the same time associated with an increasing evaporation of phosphorus pentoxide.

In accordance with another known method, steam is injected into the combustion gases of white phosphorus in such an amount that the oxidation products are hydrated to a phosphoric acid having a concentration of between 104.9 and 116% $H_3PO_4$. The cooling is effected by absorption of the hot reaction products in an acid film covering the wall of the combustion chamber, the acid film having a concentration of between 104.9% and 116% $H_3PO_4$.

Satisfactory space-time yields can, however, only be obtained if a sufficiently rapid removal of the large heat of combustion of the phosphorus and of the heat of hydration of the phosphorus pentoxide which must be taken up by the acid covering the wall can be assured.

Temperature and concentration of this acid determine the relative vapor pressure of the oxidation and hydration products over the liquid phase. If the vapor pressure of the acid exceeds the partial pressure of said products in the gaseous phase, no absorption takes place but the acid evaporates. If the concentration of the oxidation products in the gaseous phase exceeds the partial pressure over the liquid phase, absorption occurs and the volume of acid increases. The vapor pressure of the acid serving as absorption medium therefore determines the top temperature limit. Another reason not to permit the temperature of the acid to exceed a given temperature limit is its corrosive properties which increase considerably with a decrease in the $P_2O_5$ concentration, and an increase in the temperature.

It is furthermore known that the acid film which protects the wall of the combustion chamber against overheating forms a coherent layer more readily, the higher the concentration and the lower the temperature. If the viscosity of the acid is increased, either by increasing the $P_2O_5$ concentration or reducing the temperature to below 180° C., and preferably below 140° C., a coherent acid film of corresponding thickness is formed.

The large amounts of heat which occur must therefore be dissipated by sufficient cooling either by the wall of the combustion chamber, or in a separate cooler while maintaining the temperature limits.

The heat of the acid serving as absorption medium must be transmitted through a boundary layer to a cooling medium.

It has now been found that heat transfer from polyphosphoric acid to a cooling medium through a boundary layer, preferably a metal wall, becomes progressively poorer as the $P_2O_5$ concentration of the polyphosphoric acid rises. For instance, the heat transfer coefficient drops upon comparison of a phosphoric acid having 85% $H_3PO_4$ with an acid having 116% $H_3PO_4$ to one third of the original value. At the same time, with the drop in the heat transfer upon increase in the $P_2O_5$ concentration is accompanied by an increase in the viscosity of the acid and the difficulty of transporting said acid through a suitable cooling system, therefore, increases. For the above reasons, the cost of cooling becomes uneconomical if the heat of combustion of the phosphorus must be handled with highly concentrated polyphosphoric acid.

In the production of highly concentrated polyphosphoric acid, one must distinguish between absorption of the heat of combustion of the phosphorus in the acid covering the wall and the absorption of the phosphorus pentoxide formed in the combustion which, in suitable ratio with water, forms the polyphosphoric acid of high $P_2O_5$ concentration. If it is possible to separate the absorption of the heat of combustion from the absorption of the phosphorus pentoxide, circulating phosphoric acid of low concentration can be used as heat transfer agent.

In the present process, the combustion chamber is so designed that the absorption of the main portion of the heat liberated upon the reaction is separated from the formation of the after-concentrated phosphoric acid. The combustion chamber therefore comprises two acid circuits, the first of which sprinkles on the wall of the combustion chamber and is operated with phosphoric acid of low concentration, for instance less than 107% $H_3PO_4$, and preferably 105% to 107% $H_3PO_4$. Via this recirculated acid, the heat of combustion is dissipated in a suitable cooling system. The $H_3PO_4$ concentration of the acid is maintained constant by the addition of water or commercial phosphoric acid. In the second acid circuit, the phosphorus pentoxide contained in the combustion gases is absorbed in a polyphosphoric acid which has the desired final concentration of, for instance, more than 107% $H_3PO_4$. The $P_2O_5$ is converted into polyphosphoric acid by adding water or phosphoric acid, preferably phosphoric acid obtained in the first acid circuit.

By appropriately designing the combustion chamber, the heat in the two circuits is so divided that the heat of combustion of the phosphorus is mainly removed by transfer into a more dilute acid coolant in a first circuit; the more highly concentrated acid absorbent in a second circuit acts as a vehicle for transfer of a minor proportion of heat produced, which corresponds to the heat of hydration of the phosphorus pentoxide absorbed in said second circuit. In comparison with known methods, the present invention makes possible the production of a highly concentrated polyphosphoric acid of, for instance, more than 107% $H_3PO_4$ without encountering difficulties in cooling or becoming uneconomical.

An apparatus suitable for use in carrying out the method of the invention is shown in the accompanying drawing. The combustion chamber is divided into two chambers 1 and 10 which are partially inserted one in the other and taper slightly downward to assure better acid sprinkling. The heat evolved in the combustion of the phosphorus effected by means of the nozzle 2 and a given part of the phosphorus pentoxide formed are absorbed by the more weakly concentrated phosphoric acid of lower concentration sprinkled over the wall 3A. In order to obtain a uniform distribution, the acid is charged onto the wall at the top of the tower through a suitable device, for instance, a spray ring 4. The acid is removed at 5 and recycled by means of a pump 7 via a storage container 6 provided with a discharge outlet and a connecting pipe to circuit II (18). The heat exchange takes place via the cooled tower wall and a heat exchanger 8. The acid in circuit I is maintained at a constant $P_2O_5$ concentration by introducing water or phosphoric acids of lower concentration through the inlet 9.

A large part of the phosphorus pentoxide is absorbed in the inner funnel 10 in concentrated polyphosphoric acid of, for instance, more than 107% $H_3PO_4$, which is charged onto the wall at the upper edge by a suitable device, for instance an overflow 11. The uppermost edge 21 of the inner funnel which is directly exposed to the area of combustion consists of a material particularly resistant to hot phosphoric acid, preferably graphite.

For the complete absorption of the phosphorus pentoxide contained in the combustion gases, there is employed an absorption tower which is sprinkled with the acid contained in circuit II, containing, for instance, more than 107% $H_3PO_4$. The absorption tower can be arranged directly below the combustion tower, as well as to the side thereof. The absorption tower advantageously is designed as a pipe 12, provided for the distribution of the acid with centrifuges or rotating elements 22 which are fed with a part of the acid film trickling down the walls. Other absorption devices may also be employed.

The highly concentrated acid leaves the collecting funnel 13 and is circulated by means of a pump 15 out of the receiving tank 14 through a small heat exchanger 16 to carry off the residual heat in the circuit. The polyphosphoric acid produced containing, for instance, more than 107% $H_3PO_4$ is recovered from the storage tank 17.

The removed acid is replenished by the addition of acid from circuit I via the connection 18 or by the addition of water or commercial phosphoric acid. The addition of acid from circuit I can be effected continuously or batchwise. The blower 19, produces a slight vacuum in the combustion tower and the stream of gas is conducted through a cyclone 20 to completely remove entrained acid.

The advantage of the two-circuit method, as compared with the known methods is that the difficulties which occur in discharging the heat from highly concentrated phosphoric acids are avoided since the amounts of heat evolved upon the reaction are discharged by means of the more dilute acid circulating in circuit I before the acid becomes more highly concentrated in circuit II by absorption of the still remaining portion of the $P_2O_5$ whereby the heat transfer coefficient is impaired.

The separation of heat absorption in circuit I and $P_2O_5$ absorption in circuit II cannot, of course, be effected with complete exactness. Thus it will, for instance, be the case that—and this may even be desirable under certain circumstances—a certain amount of $P_2O_5$ is absorbed already in circuit I and a small portion of the heat of combustion is absorbed only in circuit II. The distribution of the absorption of the phosphorus pentoxide over the two circuits and the possibilities of influencing this distribution equilibrium is also of great importance.

By suitable selection of the distribution equilibrium, the plant can be operated either exclusively for the production of highly concentrated polyphosphoric acid containing, for instance, more than 107% $H_3PO_4$ or for excess production of acid in circuit I containing, for instance, less than 107% $H_3PO_4$ and preferably 105 to 107% $H_3PO_4$, the quantitative ratio of the acids obtained in circuits I and II being dependent on the distribution equilibrium.

If highly concentrated polyphosphoric acid is produced, it is advantageous to operate the plant in such a manner that the plant is in equilibrium, i.e., that the distribution equilibrium of phosphorus pentoxide over the two circuits is so adjusted that in the acid obtained in the first circuit by reaction of the absorbed phosphorus pentoxide with water or commercial phosphoric acid, the desired $P_2O_5$ concentration can be maintained in circuit II without further addition of water, etc. In this case, there is obtained in circuit I at the same time an additional absorption of a part of the heat of hydration of the phosphorus pentoxide in circuit I, whereby the heat load of Circuit II is still further reduced.

Under equilibrium conditions, the ratio of the phosphorus pentoxide absorption depends on the $P_2O_5$-concentration of the acid selected in the two circuits and on the $P_2O_5$-concentration of the commercial phosphoric acid added in circuit I. In the case of an acid having a concentration of, for instance, 76% $P_2O_5$ in circuit I and, for instance, 84% $P_2O_5$ in circuit II, the value of the absorption coefficient in circuit I referred to the water added is $\alpha = 0.60$, i.e., 60% of the total phosphorus pentoxide produced must be absorbed in circuit I and 40% in circuit II, in order to maintain the acid produced in equilibrium. The absorption coefficient corresponds to the ratio of phosphorus pentoxide absorbed in circuit I to the total phosphorus pentoxide. If the absorption coefficient $\alpha$ is greater than the equilibrium value, an excess production of acid in circuit I is the result; if $\alpha$ is smaller, a further addition of water or of commercial phosphoric acid in circuit I becomes necessary. Of course, orthophosphoric acids of low concentrations can also be added in circuit I, but this results in an impairment of the heat distribution so that it is recommended to use acids having a $P_2O_5$-content which is greater than that of the commercial concentrated phosphoric acid.

A desired excess production of acid having less than, for instance, 107% $H_3PO_4$ in circuit I can be obtained by increasing the coefficient of absorption referred to the added water, or by the addition of commercial phosphoric acid, or a mixture having a given ratio of water and phosphoric acid.

Depending on the concentration of acid desired in circuit I and circuit II and depending on the ratio in which the two acids shall be produced, it is necessary to absorb corresponding amounts of acid in circuits I and II.

The value of the absorption coefficient is determined by the size and design of the acid-sprayed surface of the combustion chamber. The absorption coefficient results as a function of several variables, represented by the size of surface, radius and inclination of the combustion chamber, length of the funnel, velocity of flow and temperature of the combustion gases, as well as the concentration of the phosphorus pentoxide in the combustion gases. In view of the fact that the size of the surface of the combustion chamber is not readily variable, the plant is designed beforehand for a given absorption coefficient.

The absorption of phosphorus pentoxide in circuit I within the limits of about 20%, which permits an adaption to changed conditions, and a fine adjustment of the absorption coefficient can be regulated by additional measures which are based on a variation of the above-mentioned variables, without any change in the geometrical conditions of the combustion chamber.

A change in the absorption surface of the tower relative to the $P_2O_5$-charged combustion gas stream is obtained by vertical displacement of the phosphorus nozzle in the combustion tower. The phosphorus combustion nozzle is so designed that it can be displaced vertically through the cover of the tower into the combustion tower, and its depth of immersion can be varied. With a reduction in the distance of the nozzle head from the inner absorption funnel, the absorption surface of circuit I is at the same time decreased and the absorption coefficient is lowered, which corresponds to an increase of the $P_2O_5$ proportion in circuit II.

Although the absorption surface of circuit I is so designed that it corresponds to the maximum desired absorption coefficient which attains its larger value in circuit I upon the reaction of phosphorus pentoxide with water, and the maximum possible acid concentration, and additional increase of the absorption is possible by imparting a rotary motion to the combustion gases. The rotary motion is best produced by the imparting of a twist to the gas fed to the combustion nozzle. The two effects are in opposition to each other, and can be applied either separately or in combination.

A change in the absorption coefficient is furthermore obtained by increasing or reducing the velocity of flow of the combustion gases in the tower. An increase in the velocity of flow can be obtained by increasing the amount of combustion air above the minimum value necessary for the burning of the phosphorus. Air or a mixture which is strongly enriched with oxygen can be used. An increase in the velocity of flow of the $P_2O_5$-containing combustion gases corresponds to a reduction of the absorption coefficient.

Furthermore, all measures which do not impair the absorption of the heat of combustion in circuit I can be used to vary the absorption coefficient.

More particularly, the process of the present invention for the production of polyphosphoric acids of high concentration by burning elementary phosphorus with air/or an oxygen-containing gas and subsequently absorbing the $P_2O_5$ formed in phosphoric acids is carried out as follows: the main portion of heat set free during the combustion reaction is removed by means of phosphoric acid circulated in circuit I through a reaction zone comprising a first absorption zone and an appropriate cooling system, while a portion of the $P_2O_5$ obtained is absorbed simultaneously with such removal of heat, and the remaining portion of the $P_2O_5$ is absorbed in polyphosphoric acid circulated in circuit II through a second absorption zone and an appropriate cooling system, the polyphosphoric acid used in circuit II having a concentration of $P_2O_5$ higher than the acid circulated in circuit I.

In accordance with the invention, at least about 30% and at most about 70%, preferably 40 to 60% of the $P_2O_5$ produced are absorbed in circuit I within the first absorption zone, and at least about 75% of the reaction heat are dissipated within circuit I. The phosphoric acid used in circuit I contains less than about 77.5% by weight $P_2O_5$, preferably about 76.0 to 77.5% by weight. The phosphoric acid used in circuit II contains more than about 77.5% by weight $P_2O_5$, preferably about 84% by weight. The acids used in circuit I and circuit II have a temperature of less than about 180° C. and generally a temperature within the range of about 60° C., advantageously 100° C., to about 40° C.

According to a further embodiment of the present invention, the concentration of the acid circulated in circuit I is kept constant by adding water and/or commercial phosphoric acid, and so is the acid circulated in circuit II by adding water and/or phosphoric acid. The phosphoric acid used in latter case is withdrawn from circuit I. A portion of the absorbed and thereby concentrated polyphosphoric acid is withdrawn continuously or batchwise from circuit II as the final product.

In the apparatus used for carrying out the present process the reaction and absorption zones comprise two chambers 1 and 10 which are partially inserted one into the other and slightly taper downward, of which the upper chamber 1 carries at its head a phosphorus combustion nozzle 2 and a spraying means 4 and at its side walls a cooling jacket 3 and a short outlet pipe 5. The short outlet pipe 5 is connected via a storage tank 6, a pump 7 and a heat exchanger 8 as circuit I to the spraying means 4. The lower chamber 10 which is open at its lower end and taken together with the surrounding jacket forms an overflow 11, is connected with a tower 12 provided with absorbing means and projecting into a collecting funnel 13.

The collecting funnel 13 communicates via a cyclone 20 and a blower 19 with the atmosphere and further communicates at its outlet side with a collecting tank 14, which in turn is connected to the storage tank 6 and via a pump 15 and a heat exchanger 16 in circuit II to the overflow 11, and is further connected through a pump 17a to the storage tank 17.

The upper funnel edge of the lower chamber 10 is advantageously covered with a material especially resistent to hot phosphoric acid, preferably graphite. The absorption means used in tower 12 are centrifuges which are fed with a portion of the acid flowing down the tower walls. The combustion nozzle 2 is disposed so as to be displaceable in the direction of its longitudinal axis.

The following examples serve to illustrate the invention but they are not intended to limit it thereto, the process being illustrated with reference to the accompanying drawing.

EXAMPLE 1

50 kg./hr. elementary, yellow phosphorus were burned in a combustion tower 1 with the aid of combustion nozzle 2. 250 to 300 m.$^3$/hr. air were necessary for the combustion. In order to absorb the $P_2O_5$ formed, the walls of combustion tower 1 were sprinkled per hour with 25 m.$^3$ of circulated polyphosphoric acid of 76% $P_2O_5$ (circuit I), and the lower chamber 10 which is open at its upper end and connected to tower 12 provided with customary absorption means, was sprinkled per hour with 20 m.$^3$ circulated polyphosphoric acid of 84% $P_2O_5$ (acid circuit II). The $P_2O_5$ obtained from the combustion gases was used to absorb the combustion heat and the hydration heat evolved in the two acid circuits.

The acid in circuit I on passing the tower is heated from 89° C. to 102° C. and the acid in circuit II from 130° C. to 135° C. The heat evolved was dissipated in heat exchangers 8 and 16 and via the water-cooled wall 3 of combustion tower 1. Heat exchanger 8 was operated per hour with 10 m.$^3$ cooling water at 18° C., the temperature of which rose to 31° C., and heat exchanger 16 was operated per hour with 15 m.$^3$ cooling water at 18° C., the temperature of which rose to 22° C. The tower jacket 3 was charged per hour with 10 m.$^3$ cooling water which was heated from 18 to 26° C.

60 kg. polyphosphoric acid of 76% $P_2O_5$ were produced per hour in acid circuit I while adding 14 kg./hr. water. The acid so obtained was introduced through acid line 18 into circuit II.

136 kg./hr. polyphosphoric acid of 84% $P_2O_5$ were obtained in circuit II while adding 60 kg./hr. polyphosphoric acid of 76% $P_2O_5$ emanating from circuit I and 7.5 kg./hr. water. The polyphosphoric acid produced in circuit II was removed through acid line 17a. The $P_2O_5$-yield thus amounted to 99.7%.

EXAMPLE 2

Under the conditions specified in Example 1 the process was conducted in a manner such that 90 kg./hr. polyphosphoric acid of 76% $P_2O_5$ were produced in circuit I while adding 21.5 kg./hr. water. The acid so obtained was introduced through acid line 18 into circuit II. In circuit II, 136 kg./hr. polyphosphoric acid of 84% $P_2O_5$ were obtained while adding 90 kg./hr. polyphosphoric acid of 76% $P_2O_5$ emanating from circuit I. The polyphosphoric acid produced in circuit II was withdrawn through acid line 17a. The $P_2O_5$-yield thus amounted to 99.7%.

EXAMPLE 3

Under the conditions specified in Example 1 the process was conducted in such a manner that 131 kg./hr. polyphosphoric acid of 76% $P_2O_5$ were produced in circuit I while adding 82 kg./hr. commercial phosphoric acid of 85% $H_3PO_4$. The acid so obtained was introduced into circuit II through acid line 18. 196 kg./hr. polyphosphoric acid of 84% $P_2O_5$ were produced in circuit II while adding 131 kg./hr. polyphosphoric acid of 76% $P_2O_5$ emanating from circuit I. The acid produced in circuit II was removed through acid line 17a. The yield was 99.7%.

We claim:

1. Apparatus for the production of highly concentrated polyphosphoric acid, said apparatus being substantially comprised of a first chamber tapering downwardly, having an open lower end and a closed upper end and being provided at said upper end with a phosphorus combustion means and a wall spray means opening into said first chamber; a second chamber tapering downwardly, having an open upper end and an open lower end, said second chamber having dimensions smaller than those of said first chamber and being telescoped into said open lower end of the first chamber and surrounded therein by a jacket to provide an overflow; and absorption tower directly downstream of the said second chamber opening into a funnel-shaped collector; said first chamber being surrounded by a cooling jacket and being provided with a discharge socket disposed laterally with respect thereto, said discharge socket having a reservoir tank, a first pump and a first heat exchanger connected to it to provide a first cycle connection between said discharge socket and said wall spray system disposed at the upper end of said first chamber; and said funnel-shaped collector being connected to a second tank, said second tank having a second pump and a second heat exchanger connected to it to provide a second cycle connecting said funnel-shaped collector to the said overflow, to said reservoir tank forming part of the first cycle connection, and to a storage container; and said funnel-shaped collector being arranged to communicate with atmosphere, through a cyclone and a blower connected thereto.

2. An apparatus as claimed in claim 1 wherein the edge of the upper end of said second chamber is covered with a material especially resistant to hot phosphoric acid.

3. An apparatus as claimed in claim 2, wherein the edge of the upper end of said second chamber is covered with graphite.

4. An apparatus as claimed in claim 1, wherein rotating elements are mounted in said absorption tower, and said rotating elements being fed with a part of the acid sprinkling down the walls of the tower.

5. An apparatus as claimed in claim 1, wherein said apparatus has a substantially vertical longitudinal axis, said phosphorus combustion means comprises a combustion nozzle disposed substantially along said longitudinal axis, and mounting means connecting said combustion nozzle to said apparatus permitting adjustment of the position of said combustion nozzle along said longitudinal axis.

References Cited

UNITED STATES PATENTS 2,611,681  9/1952  Bellinger _____ 23—165
3,057,700  10/1962 Gross _____ 23—165

JAMES H. TAYMAN, JR., Primary Examiner

U.S. Cl. X.R.

23—165, 305; 55—223, 229, 240; 159—4; 261—146, 147, 149